Figure 2:
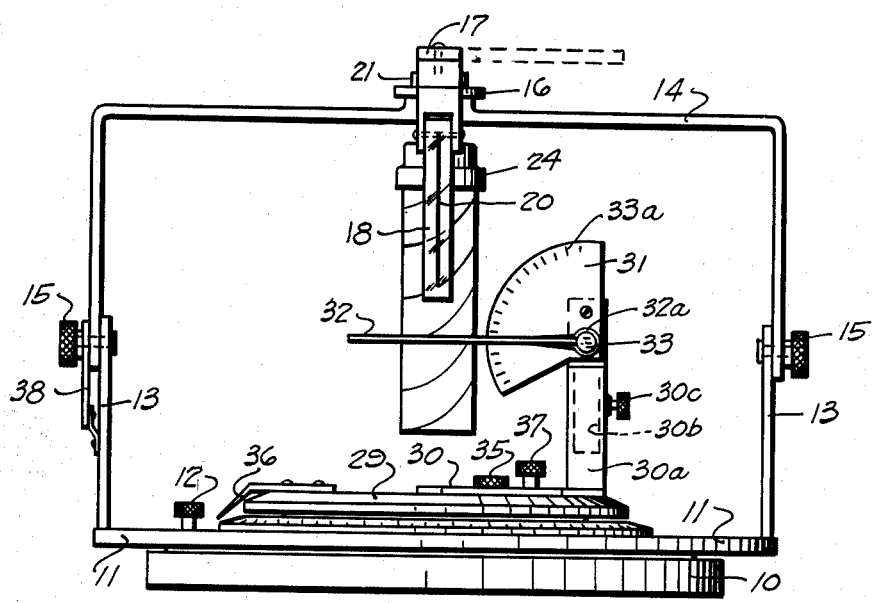

April 22, 1952      C. F. JOHNSON      2,594,029
READING DEVICE FOR CORE ORIENTING EQUIPMENT
Filed July 31, 1948      2 SHEETS—SHEET 1
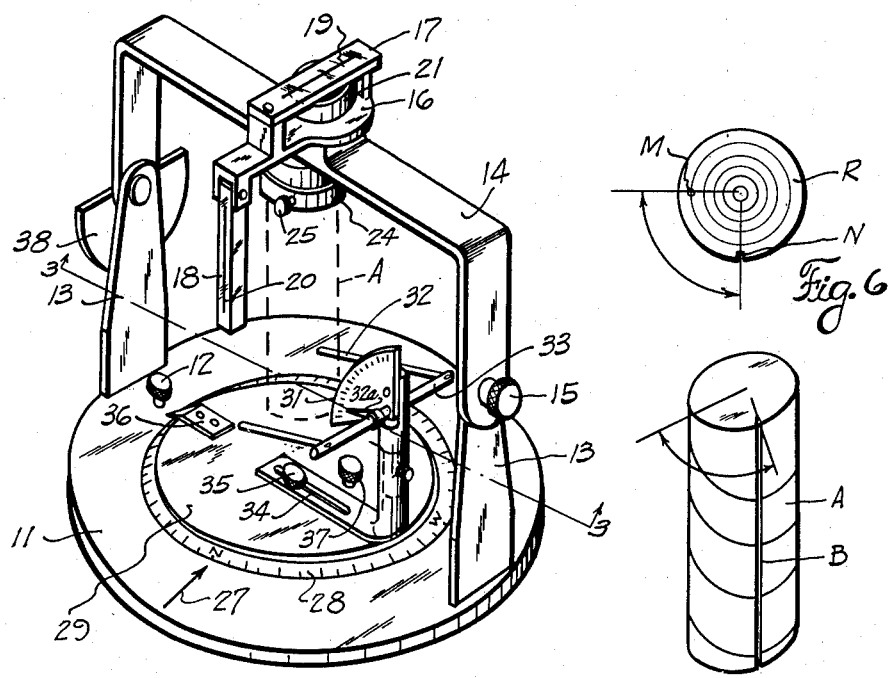
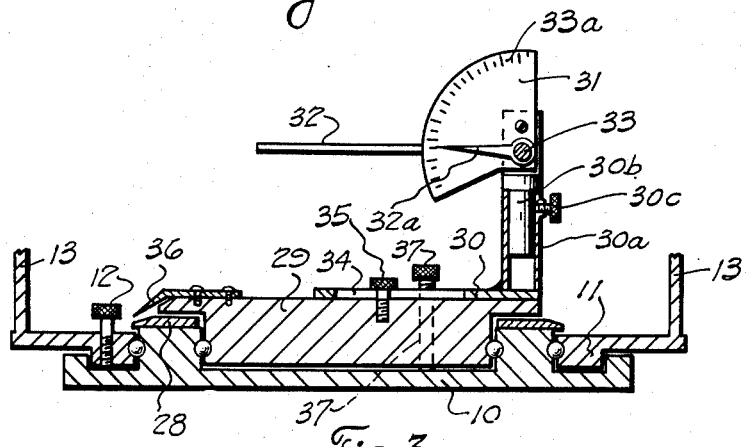
Inventor
Charles F. Johnson
By Joel E. Edwards
attorney April 22, 1952 C. F. JOHNSON 2,594,029
READING DEVICE FOR CORE ORIENTING EQUIPMENT
Filed July 31, 1948 2 SHEETS—SHEET 2

Inventor
Charles F. Johnson
By Joe E. Edwards
attorney

Patented Apr. 22, 1952

2,594,029

UNITED STATES PATENT OFFICE 2,954,029

READING DEVICE FOR CORE ORIENTING EQUIPMENT

Charles F. Johnson, Houston, Tex., assignor to Eastman Oil Well Survey Company, Denver, Colo., a corporation of Delaware Application July 31, 1948, Serial No. 41,774

9 Claims. (Cl. 33—1)

This invention relates to new and useful improvements in reading devices for core orienting equipment.

As is well known, it is desirable in the drilling of petroleum wells to determine the dip and the bearing of the dip and strike of the sub-surface strata since this information is useful in ascertaining the location of the center of a "pool or oil bearing sand." Various equipment and apparatus is in general use for cutting or "taking" a core or sample of the sub-surface formation and properly orienting said core; also core orienting equipment is in general use whereby the core or sample obtained is oriented so that it may be properly interpreted when brought to the surface. The present invention relates primarily to an improved reading device which will permit accurate determination of the dip and the bearing of the dip and strike of a core. The particular core may be obtained by any of the well-known oriented coring equipment now in general use.

One object of the invention is to provide an improved reading or interpreting device which is constructed to receive the core or sample and which accurately reproduces or simulates the actual position which the core had in situ, whereby an accurate determination of dip and strike of the strata may be made.

An important object of the invention is to provide an improved reading device which is adaptable for use in determining the dip and strike of the strata traversed by an oriented core, which core has been obtained simultaneously with and in relation to a survey instrument record; said reading device having means for accurately correlating the survey instrument record and the orientation mark on the core, whereby efficient determination of the dip of the strata from the actual core may be accomplished.

Still another object of the invention is to provide an improved reading device for interpreting oriented cores which is provided with a holder assembly for receiving the core at one end and the instrument record at the other, said assembly being rotatable independently at either end or as a unit whereby the core may be properly located in the reader with respect to the survey instrument record; said holder also being mounted so that it may be inclined to a desired angle or rotated to a desired direction whereby the position of the core in the reader accurately reproduces the position of the core in situ at the time it was taken.

A further object of the invention is to provide an improved reader having means for accurately correlating the survey instrument record with the orientation mark on the core, together with various adjustments which make it possible to locate the core within the reader facing in the proper compass direction and disposed at a desired angle, together with means for accurately determining the dip of the strata in said core.

The construction designed to carry out the invention will be hereinafter described together with other features of the invention.

Figure 4:
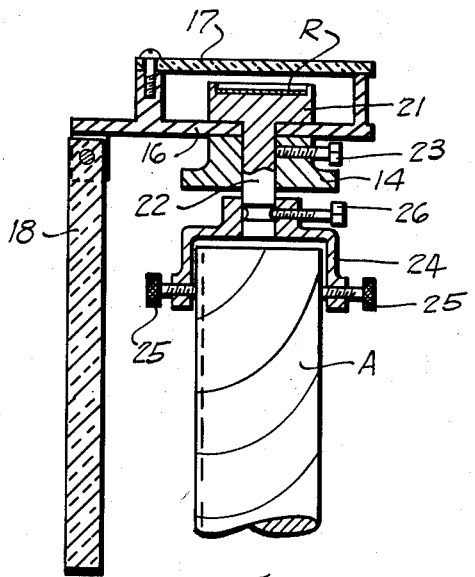
Figure 5:
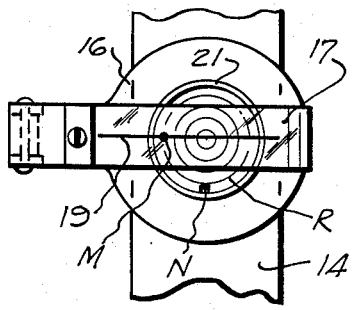

The invention will be more readily understood from a reading of the following specification and by reference to the accompanying drawing, wherein an example of the invention is shown, and wherein:

Figure 1 is an isometric view of a reading device constructed in accordance with the invention, Figure 2 is a side elevation of the device, Figure 3 is a transverse, vertical, sectional view taken on the line 3—3 of Figure 1, Figure 4 is an enlarged, vertical, sectional view taken through the holder assembly, Figure 5 is a plan view of the assembly shown in Figure 4, Figure 6 is a plan view of the survey instrument record, and Figure 7 is an isometric view of an oriented core adapted to be interpreted by the reading device.

In the drawings, the letter A designates an oriented core or sample which has been obtained from the sub-surface formation by any well-known core orienting equipment. As an example, the core may be obtained by the core orienting equipment illustrated in the co-pending application of Charles T. Engle filed November 27, 1945, Serial No. 631,052, Patent No. 2,489,566 granted November 29, 1949, although it is to be understood that the core may be obtained by other types of apparatus or equipment. The core is formed with an orienting groove or channel B which groove bears a known relationship to an orienting notch N which is formed in the peripheral portion of a survey instrument record disk R. The disk R indicates the low side of the well bore from which the core was taken by means of a low side indication M. Thus, at the time the core A was taken, the notch N in the record disk R was aligned with the orienting groove B in said core and the angle between the groove B and the low side indication M will make it possible to ascertain the compass direction of the groove. It is, of course, well-known that ordinarily survey instruments provide information as to the compass direction of the low side indication M.

As shown in Figures 6 and 7 with the low side indication M representing due west, the notch N in the record disk which is the position of the oriented groove B in the core is due south. In order to accurately correlate the indications of the record disk R with the orienting groove B in the core A, the improved reading device forming the present invention is provided.

The reading device includes a base 10 having an outer flanged ring 11 rotatable around its peripheral portion. A set screw 12 may be employed to lock the ring 11 in any desired position. Diametrically opposed upright standards 13 extend upwardly from the ring 11 and a U-shaped bracket or support 14 has its ends pivotally secured to the upper ends of the standards 13. The bracket 14 may be frictionally locked in various angular positions with respect to the vertical standards 13 by hand operated friction nuts 15. At the center of the bracket 14 is a supporting plate 16 which is secured to said bracket. This supporting plate carries a horizontal transparent aligning member 17 and also carries a vertical transparent aligning bar 18. The horizontal member 17 has a reference line 19 displayed thereon while the aligning bar 18 has a similar index line 20 imprinted thereon. A record disk holder 21 for receiving the record disk R is secured to the upper end of a shaft 22 which is rotatable within the bracket 14 and also within the supporting plate 16. A set screw 23 which is threaded through the bracket 14 is adapted to engage the shaft 22 to lock the same in various adjusted positions. A recessed core holder 24 is mounted on the lower end of the shaft 22 and the upper end of the core A is arranged to be inserted therein and clamped by suitable retaining screws 25. The core holder 24 is adjustable rotatably on the shaft 22 and is locked in adjusted positions by a set screw 26.

In interpreting the core, the record disk R having the notch N and the indication M thereon is inserted within the holder 21 of the reading device, while the core A has its upper end inserted into the core holder 24 and retained therein by the screws 25. The notch N of the record disk R is aligned with the index line 19 of the horizontal aligning member 17, this being accomplished by rotating the shaft 22 and its holders 21 and 24. After this alignment is made the set screw 23 is tightened to maintain the notch N aligned with the index line 19. The set screw 26 is then loosened and the core holder 24 rotated to align the groove B in the core with the index line 20 of the aligning bar 18, after which the set screw 26 is again tightened. The index lines 19 and 20 of the two aligning members 17 and 18 are located in the same vertical plane and thus the orienting groove B on the core may be accurately aligned with the notch N of the record disk. It will be remembered that at the time that the record was made by the survey instrument and the core was taken within the well bore, the groove B and the notch N were in the same vertical plane and thus this condition is reproduced in the reading device.

After proper vertical alignment of the groove B and the notch N is made, the set screw 23 is loosened and the entire assembly is rotated so that the indication M on the disk is aligned with the index 19 of the horizontal member. The set screw 23 is then tightened. The index lines 19 and 20 lie in the same vertical plane as an indicating arrow 27 which is displayed on the upper surface of the supporting ring 11 which carries the bracket and, therefore, when the indication M on the disk is in alignment with the index 19, it is also in alignment with the indicating arrow 27. At this time the notch N on the disk and the groove B in the core lie in the same vertical plane since they had been previously adjusted to do so.

Adjacent the rotatable ring 11 is a compass rose ring 28 which is secured to the base 10 of the reading device. Inside of the ring 28 is a turntable 29 which carries an angular bracket 30. The upright portion of the bracket is tubular as indicated at 30a and a quadrant 31 is secured to a cylindrical stem 30b, the latter projecting downwardly within the bore of the tubular leg of the bracket. A suitable set screw 30c locks the quadrant in various adjusted vertical positions with respect to the bracket. Measuring rods 32 have their inner ends secured within the extremities of a rotatable shaft 33 which is journalled within the lower portion of the quadrant. A suitable pointer or indicator 32a is fastened on the shaft 33 adjacent the face of the quadrant 31 and this indicator is in alignment with the measuring rods 32, whereby as the arms are moved to various angular positions with respect to the quadrant, the pointer or indicator 32a indicates the degree of inclination on a suitable scale 33a provided on the quadrant. The lower leg of the bracket 30 is provided with an elongated slot 34 and a set screw 35 makes it possible to move the entire quadrant assembly to a desired adjusted position radially of the turntable 29. An indicator 36 which is aligned diametrically with the lower leg of the angular bracket 30 overlies the compass rose ring 28. The turntable may be locked in various adjusted positions to which it may be rotated by a suitable set screw 37 which extends through the turntable and which frictionally engages the base 10.

In using the reading device the core A is mounted within the holder 24 and the record disk R is mounted in the holder 21. The aligning members 17 and 18 are employed to accurately locate the groove B of the core and the notch N of the record disk in the same vertical plane. After this alignment is carried out, the set screw 26 is tightened to lock the core and the record disk in this aligned position. The set screw 23 is then loosened and the record disk and core are rotated as a unit to align the indication M on the record disk R with the index line 19 of the horizontal aligning member 17. Since the index line 19 is in the same vertical plane as the indicating arrow 27 of the rotatable base ring 11, it will be apparent that the indication M, which is representative of the low side of the hole is aligned or in the same vertical plane as the arrow 27. The frictional lock nuts 15 are then loosened and by means of a quadrant 38 mounted on one of the standards 13 the bracket 14 is inclined from a vertical position to an angular position in accordance with the angle of deviation of the bore hole. Thus, the core which is held in the holder 24 of the bracket is inclined to the same position which it had in the well bore at the time that it was cut or drilled out. The base ring 11 is then rotated to rotate the indicating arrow 27 in the same compass direction as the low side of the well bore. The set screw 12 then locks the outer ring 11 in this position and obviously at this time the core A has assumed a position within the reader which is the exact duplication of its position within the well bore at the time that it was drilled. The bracket 30 which is mounted on the turntable 29 may then be properly rotated to place the aligning rods 32, one on each side of the core. The set screw 37 may then be utilized to lock the turntable and bracket in adjusted position. By manipulating the rods 32 on their pivotal connection with the bracket 30 the angle of the bedding planes in the core may be accurately determined. Thus, accurate information as to the angle of dip is obtained. The indicating pointer 36 which is secured to the bracket 30 will, of course, give the information as to the direction of dip.

The reading device is accurate and very simple in its operation. The important feature of the device is the fact that it accurately duplicates the position which the core had during the actual drilling out of said core. Means is provided for accurately orienting said core and for determining the angle of the various bedding planes.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A reading device for a core-orienting apparatus which produces a record disk having a representation of the low side of the well bore and which marks the core taken thereby, said device including a base having a compass rose thereon, a support rotatable on the base, means on said support for receiving the record disk and the core in the same position the disk and core had within said bore, a turntable mounted on the base and rotatable with respect to the compass rose, spaced aligning rods mounted on the turntable and adapted to straddle the core, means on said turntable for mounting the rods to swing in vertical planes, and a quadrant for indicating the angle of vertical swing of said aligning rods.

2. A reading device for a core-orienting apparatus which produces a record disk having a representation of the low side of the well bore and which marks the core taken thereby, said device including a base having a compass rose thereon, a support rotatable on the base, means on said support for receiving the record disk and the core in the same position the disk and core had within said bore, a turntable mounted on the base and rotatable with respect to the compass rose, spaced aligning rods mounted on the turntable and adapted to straddle the core, means on said turntable for mounting the rods to swing in vertical planes, and a lateral indicator disposed parallel to the rods and secured to the turntable, said indicator overlying the compass rose to indicate the compass direction of said rods.

3. A reading device for a core-orienting apparatus which produces a record disk having a representation of the low side of the well bore and which marks the core taken thereby, said device including a base having a compass rose thereon, a support, means mounting said support for rotation on the base, means on said support for receiving the record disk and the core in the same relative position the disk and core had within said bore, a turntable mounted on the base and rotatable with respect to the compass rose, spaced aligning rods mounted on the turntable and adapted to straddle the core, means on said turntable for mounting the rods to swing in vertical planes, and means on said mounting means for pivotally mounting the support on a horizontal axis to swing with respect to the vertical, whereby the core carried by said support may be inclined in the reader to the same position of inclination which it had within the well bore.

4. A reading device as set forth in claim 1, together with a lateral indicator disposed parallel to the rods and secured to the turntable, said indicator overlying the compass rose to indicate the compass direction of said rods.

5. A reading device as set forth in claim 1, together with means forming part of the support for pivotally mounting the record disk and core receiving means on a horizontal axis to swing with respect to the vertical, whereby the core carried by said support may be inclined in the reader to the same position of inclination which it had within the well bore.

6. A reading device for a core-orienting apparatus which produces a record disk having a representation of the low side of the well bore and which marks the core taken thereby, said device including a base having a compass rose thereon, a support rotatable on the base, upstanding arms mounted on the support and connected at their upper ends by a lateral supporting bar, a holder assembly mounted in the supporting bar for receiving the record disk and also for receiving the core, said holder assembly including transparent aligning means associated with said assembly for aligning said core and disk to the same position the disk and core had within said bore, a turntable mounted on the base and rotatable with respect to the compass rose, spaced aligning rods mounted on the turntable and adapted to straddle the core, and means for mounting the rods on the turntable to swing in vertical planes.

7. A reading device as set forth in claim 6, together with a quadrant adjacent the rods for indicating the angle of vertical swing of said bars, and a lateral indicator disposed parallel to the rods and secured to the turntable, said indicator overlying the compass rose to indicate the compass direction of said rods.

8. A reading device as set forth in claim 6, wherein the holder assembly includes a rotatable disk carrier for receiving the record disk and a rotatable collar member for receiving the upper end of the core, together with friction means for restraining rotation of the disk carrier with respect to the core receiving member, whereby said member and carrier may be rotated with respect to each other or simultaneously as a unit.

9. A reading device as set forth in claim 6, wherein the holder assembly includes a rotatable disk carrier for receiving the record disk and a rotatable collar member for receiving the upper end of the core, together with friction means for restraining rotation of the disk carrier with respect to the core receiving member, whereby said member and carrier may be rotated with respect to each other or simultaneously as a unit, and transparent aligning means adjacent the disk carrier and also extending parallel to the core, whereby the indication on the record disk may be accurately aligned with the mark on the core.

CHARLES F. JOHNSON.

REFERENCES CITED

The following references are of record in the file of this patent:

UNITED STATES PATENTS

| Number | Name | Date |
|---|---|---|
| 1,921,508 | Dawson | Aug. 8, 1933 |
| 2,089,216 | Lynton | Aug. 10, 1937 |
| 2,149,715 | Pearson | Mar. 7, 1939 |
| 2,149,716 | Beattie | Mar. 7, 1939 |
| 2,186,677 | Humphreys | Jan. 9, 1940 |
| 2,190,790 | Humphreys | Feb. 20, 1940 |
| 2,357,617 | Subkow et al. | Sept. 5, 1944 |
| 2,489,566 | Engle | Nov. 29, 1949 |